(12) United States Patent
Strobel et al.

(10) Patent No.: US 10,797,751 B2
(45) Date of Patent: *Oct. 6, 2020

(54) COMMUNICATION COEXISTENCE IN OVERLAP SPECTRUM

(71) Applicant: Lantig Beteiligungs-GmbH & Co. KG, Neubiberg (DE)

(72) Inventors: Rainer Strobel, Munich (DE);
Vladimir Oksman, Morganville, NJ (US)

(73) Assignee: Lantiq Beteiligungs-GmbH & CO. KG, Neubiberg (DE)

( * ) Notice: Subject to any disclaimer, the term of this patent is extended or adjusted under 35 U.S.C. 154(b) by 3 days.

This patent is subject to a terminal disclaimer.

(21) Appl. No.: 16/111,905

(22) Filed: Aug. 24, 2018

(65) Prior Publication Data
US 2019/0158140 A1 May 23, 2019

Related U.S. Application Data

(63) Continuation of application No. 14/920,587, filed on Oct. 22, 2015, now Pat. No. 10,069,532.
(Continued)

(51) Int. Cl.
*H04B 3/32* (2006.01)
*H04B 3/487* (2015.01)
(Continued)

(52) U.S. Cl.
CPC .............. *H04B 3/32* (2013.01); *H04B 3/487* (2015.01); *H04L 1/0001* (2013.01); *H04L 5/14* (2013.01); *H04M 3/007* (2013.01)

(58) Field of Classification Search
None
See application file for complete search history.

(56) References Cited

U.S. PATENT DOCUMENTS

| 5,887,032 A | 3/1999 | Cioffi |
| 6,408,033 B1 | 6/2002 | Chow et al. |

(Continued)

FOREIGN PATENT DOCUMENTS

| CA | 2880267 A1 | 1/2014 |
| EP | 1028558 A1 | 8/2000 |

(Continued)

OTHER PUBLICATIONS

Extended European Search Report dated May 13, 2016 for the parallel EP application 15 190 873.8.
(Continued)

*Primary Examiner* — Rebecca E Song
(74) *Attorney, Agent, or Firm* — 2SPL Patent Attorneys PartG mbB

(57) ABSTRACT

Communication in a first spectrum and via a first transmission line of first data is according to a time-division duplexing scheme such as G.fast. Communication in a second spectrum and via a second transmission line of second data is according to a frequency-division duplexing scheme such as VDSL2. The first and second spectra both comprise an overlap spectrum. The first transmission line experiences first crosstalk from the second transmission line and the second transmission line experiences second crosstalk from the first transmission line.

18 Claims, 7 Drawing Sheets

Related U.S. Application Data

(60) Provisional application No. 62/068,018, filed on Oct. 24, 2014.

(51) Int. Cl.
  *H04L 1/00* (2006.01)
  *H04L 5/14* (2006.01)
  *H04M 3/00* (2006.01)

(56) References Cited

U.S. PATENT DOCUMENTS

| | | | |
|---|---|---|---|
| 6,738,418 B1 * | 5/2004 | Stiscia | H04L 27/2605 |
| | | | 370/290 |
| 7,072,449 B2 | 7/2006 | Tomilson | |
| 7,167,509 B2 | 1/2007 | Hasegawa et al. | |
| 7,394,752 B2 | 7/2008 | Hasegawa et al. | |
| 8,824,265 B2 | 9/2014 | Maes et al. | |
| 9,160,385 B2 | 10/2015 | Ginis et al. | |
| 9,258,790 B2 * | 2/2016 | Yu | H04B 3/32 |
| 9,264,166 B2 | 2/2016 | Filipiak et al. | |
| 2004/0071165 A1 | 4/2004 | Redfern et al. | |
| 2005/0058115 A1 | 3/2005 | Levin et al. | |
| 2007/0081582 A1 * | 4/2007 | Ginis | H04B 3/32 |
| | | | 375/222 |
| 2007/0280334 A1 | 12/2007 | Lv et al. | |
| 2011/0200080 A1 * | 8/2011 | Fang | H04B 3/32 |
| | | | 375/222 |
| 2011/0206101 A1 | 8/2011 | Matza et al. | |
| 2015/0256221 A1 | 9/2015 | Rao et al. | |
| 2015/0270942 A1 * | 9/2015 | Sorbara | H04L 5/143 |
| | | | 370/295 |
| 2015/0318875 A1 * | 11/2015 | Kuipers | H04B 1/0057 |
| | | | 370/297 |
| 2016/0028434 A1 * | 1/2016 | Kerpez | H04B 3/32 |
| | | | 379/406.02 |
| 2016/0205264 A1 * | 7/2016 | Kerpez | H04M 11/062 |
| | | | 379/406.01 |
| 2016/0277069 A1 * | 9/2016 | Li | H04L 1/0001 |

FOREIGN PATENT DOCUMENTS

| | | |
|---|---|---|
| JP | 2004129281 A | 4/2004 |
| JP | 2004328065 A1 | 11/2004 |
| WO | 2014133554 A1 | 9/2014 |
| WO | 2015150732 A1 | 10/2015 |

OTHER PUBLICATIONS

Notice of Allowance dated May 17, 2018 for U.S. Appl. No. 14/920,587.

"Self-FEXT cancellation (vectoring) for use with VDSL2 transceivers", Series G: Transmission Systems and Media, Digital Systems and Networks. Digital sections and digital line system—Metallic access networks. ITU-T G.993.5. International Telecommunication Union. Telecommunication Standardization Sector of ITU. Jan. 2015.

"Draft new Recommendation ITU-T G.9701", Associate Rapporteur. International Telecommunication Union. Telecommunication Standardization Sector. Study Period 2013-2016. Study Group 15. TD 307 Rev. 1 (PLEN/15). Nov. 24-Dec. 5, 2014.

"Fast access to subscriber terminals (G.fast)—Power spectral density specification." Series G: Transmission Systems and Media, Digital Systems and Networks. Access networks—Metallic access networks. ITU-T G.9700. International Telecommunication Union. Telecommunication Standardization Sector of ITU. Apr. 2014.

Final Office Action dated Jan. 29, 2018 for U.S. Appl. No. 14/920,587.
Non-Final Office Action dated Jul. 17, 2017 for U.S. Appl. No. 14/920,587.

* cited by examiner

COMMUNICATION COEXISTENCE IN OVERLAP SPECTRUM

This application is a continuation of U.S. application Ser. No. 14/920,587 filed on Oct. 22, 2015, which claims priority to U.S. Provisional Application No. 62/068,018 filed on Oct. 24, 2014, the contents of which are incorporated by reference in their entirety.

TECHNICAL FIELD

According to various embodiments, a method and a system are provided. According to various embodiments, techniques of communicating, in a first spectrum and via a first transmission line, first data according to a time-division duplexing scheme, and communicating, in a second spectrum and via a second transmission line, second data according to a frequency-division duplexing scheme are provided. The first spectrum and second spectrum both comprise an overlap spectrum.

BACKGROUND

Recent trends in the access communications market show that data rates up to 100 Mb/s which are provided by Very High Speed Digital Subscriber Line 2 (VDSL2) services using Vectoring as defined in ITU-T Recommendation G.993.5, see ITU-T Rec. G.993.5-2010 Self-FEXT CANCELLATION (Vectoring) for Use with VDSL2 Transceivers, 2010, are not always sufficient. Bit rates up to 1.0 Gb/s are sometimes required. VDSL2 employs vectoring for noise reduction. The VDSL2 service is provided from a street cabinet in a fiber to the curb (FTTC) architecture for distances up to 1000 m.

Such high bit rates is possible with the G.fast service, see ITU-T Rec. G.9701. Fast Access to Subscriber Terminals—Physical layer specification, 2013. The G.fast technology achieves comparably high data rates in fiber to the distribution point (FTTdp) network topologies where the service is provided from a distribution point (DP) which may be as close as 50 m-100 m to the customers.

In some cases, an intermediate step between VDSL2-based FTTC and G.fast-based FTTdp can be done, such as deploying G.fast FTTdp technology from VDSL2 FTTC locations to serve short and medium reach customers with higher bit rates.

In an intermediate step—during roll-out of G.fast service—, the G.fast data rates are decreased to 200-400 MBit/s, but the reach is far beyond the regular FTTdp G.fast reach, which is 250 m. The extended reach G.fast service reaches up to 400 m and thus shall be able to coexist with regular G.fast and with VDSL2 deployed from FTTC. This will allow a gradual replacement of VDSL2 service of the FTTC with high speed FTTdp G.fast services.

Reference implementations of such gradual replacement face certain drawbacks and limitations. E.g., for long-reach G.fast-based transmission, transmission in high-frequency components of the spectrum may be attenuated significantly. On the other hand, during gradual replacement of VDSL2 systems with high speed FFTdp G.fast systems, low-frequency components of the spectrum may be occupied by the VDSL2 system. Thus, the available spectrum for G.fast-based transmission is limited.

SUMMARY

According to an aspect, a method is provided. The method comprises communicating, in a first spectrum and via a first transmission line, first data according to a time-division duplexing scheme. The method further comprises communicating, in a second spectrum and via a second transmission line, second data according to a frequency-division duplexing scheme. The first spectrum and the second spectrum both comprise an overlap spectrum. The first transmission line experiences first crosstalk from the second transmission line. The second transmission line experiences second crosstalk from the first transmission line.

According to a further aspect, a system is provided. The system comprises a first transceiver and a second transceiver. The first transceiver is configured to communicate, in the first spectrum and via a first transmission line, first data according to a time-division duplexing scheme. The second transceiver is configured to communicate, in the second spectrum and via a second transmission line, second data according to a frequency-division duplexing scheme. The first spectrum and the second spectrum both comprise an overlap spectrum. The first transmission line experiences first crosstalk from the second transmission line. The second transmission line experiences second crosstalk from the first transmission line.

According to a further aspect, a computer program product is provided. The computer program product comprises program code to be executed by at least one processor. Executing the program code by the at least one processor causes the processor to execute a method. The method comprises communicating, in a first spectrum and via a first transmission line, first data according to a time-division duplexing scheme. The method further comprises communicating, in a second spectrum and via a second transmission line, second data according to a frequency-division duplexing scheme. The first spectrum and the second spectrum both comprise an overlap spectrum. The first transmission line experiences first crosstalk from the second transmission line. The second transmission line experiences second crosstalk from the first transmission line.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 1B schematically illustrates the system of FIG. 1A at greater detail according to various embodiments, wherein FIG. 1B illustrates a FFTC topology with co-located G.fast and VDSL2 transceivers.

FIG. 1C schematically illustrates the system of FIG. 1A at greater detail according to various embodiments, wherein FIG. 1C illustrates a FFTdp topology with remote G.fast and VDSL2 transceivers.

DETAILED DESCRIPTION OF EMBODIMENTS

Figure 1A:
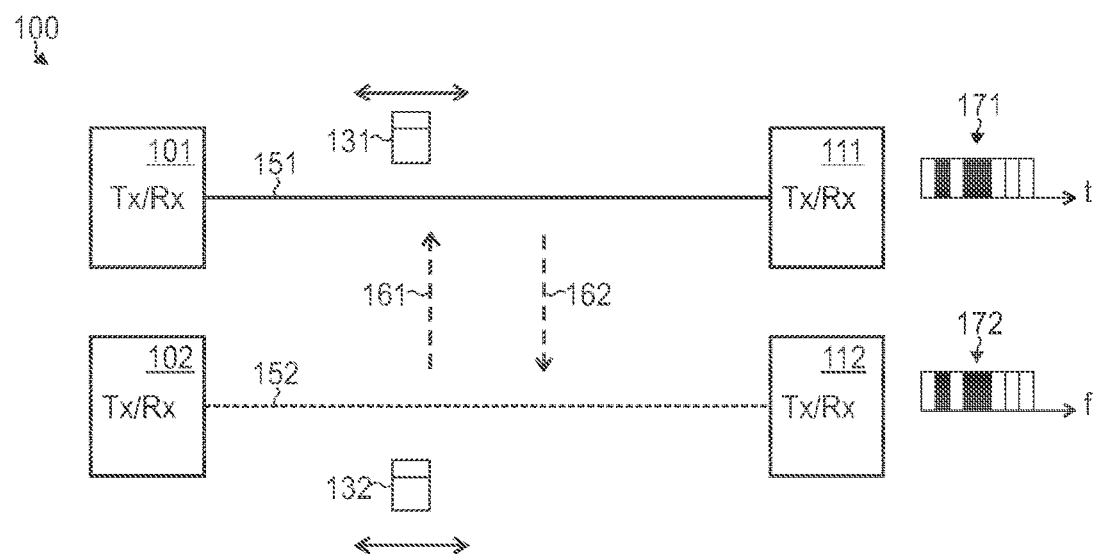
FIG. 1A schematically illustrates a system for communicating via a first transmission line and via a second transmission line according to various embodiments, wherein the first transmission line experiences first crosstalk from the second transmission line and wherein the second transmission line experiences second crosstalk from the first transmission line.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Making reference to FIG. 1A, hereinafter, techniques of coexistence between communicating in a first spectrum via first transmission line 151 and communicating in a second spectrum via a second transmission line 152 are disclosed. First data 131 is sent and/or received (communicated) via the first transmission line 151 and second data 132 is communicated via the second transmission line. The first data 131 and second data 132 may be control data, higher-layer payload data, and/or training data. Generally, techniques disclosed herein may relate to uni-directional and/or bidirectional communication, e.g., upstream (US) and/or downstream (DS) communication. Depending on US or DS communication, transceivers 101, 111, 102, 112 of the respective system 100 may operate as transmitters or receivers.

Communicating via the first transmission line is according to a time-division duplexing scheme (TDD), e.g., a synchronized TDD (s-TDD). Communicating via the second transmission lien is according to a frequency-division duplexing scheme (FDD). Hence, different services are employed for communicating via the first and second transmission lines, respectively.

The first and second transmission lines 151, 152 experience mutual crosstalk, i.e., the first transmission line 151 (second transmission line 152) experiences first crosstalk 161 (second crosstalk 162) from the second transmission line 152 (first transmission line 151).

Sometimes, this mutual crosstalk is also referred to as alien crosstalk. The crosstalk 161, 162 may comprise near-end crosstalk (NEXT) and/or far-end crosstalk (FEXT). The mutual crosstalk 161, 162 may be because of the first and second spectrum both occupy an overlap spectrum and/or because the first and second transmission lines are arranged in close spatial proximity, e.g., in the same cable binder, etc. The overlap spectrum may relate to overlapping first and second spectra. E.g., a certain frequency range of, e.g., some kHz to tens of MHz may be occupied by communication via, both, the first and second transmission lines 152.

Non alien-crosstalk, i.e., self-crosstalk of the first transmission line 151 and the second transmission line 152, respectively, may be mitigated by using the TDD service and/or FDD service and/or vectoring techniques.

In some scenarios, techniques disclosed herein may be applied for connected home applications. In particular, it may be possible to flexibly implement various transmission schemes and implement various data rates. Internet of Things application where a large number of devices is connected become possible.

In some scenarios, the techniques disclosed herein may be used for a long-reach G.fast-based transmission system which is capable to coexist with vectored VDSL or VDSL2. G.fast employs a TDD scheme while VDSL/VDSL2 employ a FDD scheme. Hereinafter, various examples are disclosed with respect to G.fast in combination with VDSL or VDSL2. However, respective scenarios and techniques may be readily applied to different kinds of transmission techniques.

Figure 1B:
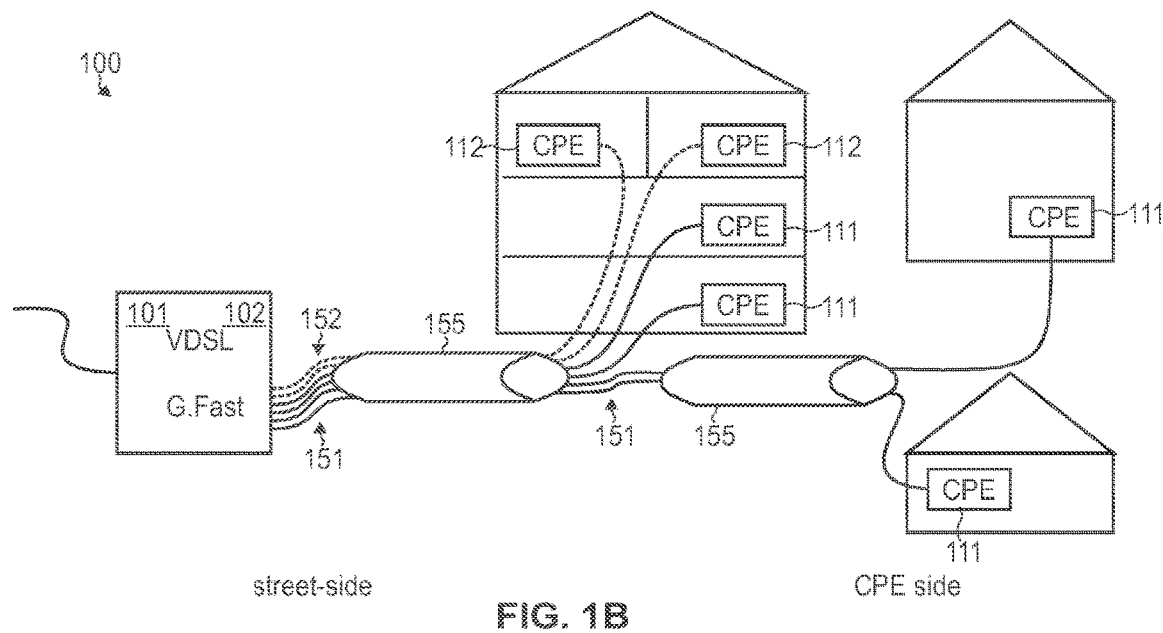
Figure 1C:
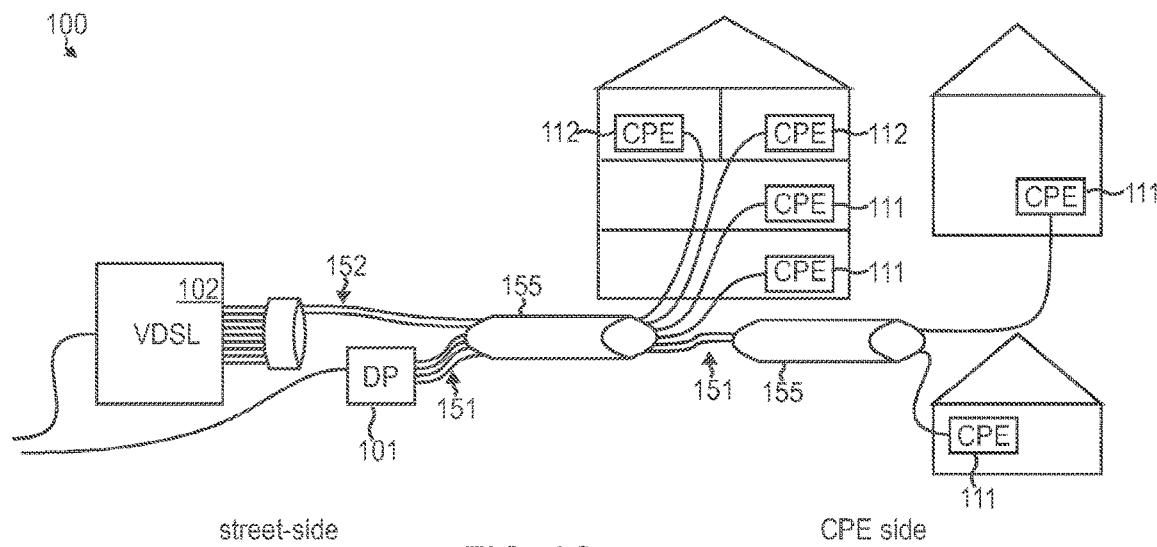

FIGS. 1B and 1C illustrate aspects of a system model serving as illustrative example. FIGS. 1B and 1C illustrate example topologies of the scenario of FIG. 1A at greater detail. Communication is implemented by the two different services 171, 172 which share the same medium and which are coupled by crosstalk 161, 162, e.g., by both NEXT and FEXT. One service 172 provides legacy service, e.g., VDSL2, and uses a lower part of the frequency spectrum, but is allowed to use higher transmission power. Another service, e.g., G.fast service 171, uses a wider frequency spectrum, but at a lower transmission power. These power settings are relative and selected to simplify the explanation. In other implementations other settings could be used.

Two topologies are presented for illustrative purposes in FIGS. 1B and 1C where the G.fast transmission line 151 and the VDSL2 transmission line 152 coexist in the same cable bundle 155. One scenario is a multi-mode street cabinet as shown in FIG. 1B, i.e., FFTC. Both G.fast service 171 and VDSL2 service 172 are provided from the street cabinet. The subscribers connected to longer line lengths or the subscribers who do not wish to be upgraded to a high performance service are served by VDSL2 transmission lines 152 with relatively low bit rate (up to 100 Mb/s).

Subscriber connected at line lengths can use the G.fast service 172 with bit rates of several hundreds Mb/s.

This scenario presented in FIG. 1B is sensitive in terms of NEXT crosstalk 161, 162 which is typically the most powerful impairment. However, because both G.fast service 171 and VDSL2 service 172 transmit their signals from the same location, their transmission can be continuously coordinated in some embodiments.

In further examples, such as the scenario illustrated in FIG. 1C, the system 100 is extended by DPs which are located closer to the subscribers. The DPs typically provide only G.fast service 171 by housing the respective transceivers 101. In the scenario presented in FIG. 1C, the VDSL2 service 172 is still provided from the street cabinet while a DP is installed closer to the customer premises equipment (CPE). Thus, for some part of the cable span, the signals of G.fast and VDSL2 transmission lines 151, 152 use the same cable binder 155, which causes mutual crosstalk 161, 162. In such scenarios, the VDSL2 service 172 mainly exists for legacy subscribers using the CPE that does not support the G.fast service 171. Another reason for the VDSL2 service 172 still being deployed from the street cabinet may be due to competition restrictions where broadband service is provided on the same cable bundle 155, but G.fast service 171 is not provided.

In the topology presented in FIG. 1C, VDSL2 and G.fast transceivers 101, 102, 111, 112 are not co-located. Thus, the NEXT between the G.fast transmission line 151 and VDSL2 transmission line 152 is attenuated by the line length between the street cabinet and the DP. The length of this line is usually in the order of hundred or hundreds of meters which provides a substantial attenuation for the NEXT. This reduces mutual crosstalk 161, 162.

However, in this scenario according to FIG. 1C, no active coordination between G.fast service 171 deployed from the DP and VDSL2 service 172 deployed from the street cabinet may be possible. In some scenarios, central coordination may be possible anyway. Dedicated signaling may be implemented. The central coordination can be used to improve stability by informing G.fast service 171 that a VDSL2 transmission line 152 starts joining and by informing VDSL2 services 172 that a G.fast transmission line 151 starts joining.

During roll-out of G.fast, gradual replacement of the VDSL service 172 by G.fast service 171 may be desired. Gradual replacement typically requires coexistence between G.fast transmission lines 151 and VDSL2 transmission lines 152. According to reference implementations, coexistence between G.fast transmission lines 151 and VDSL2 transmission lines 152 is achieved by crosstalk avoidance. Crosstalk 161, 162 is avoided by the use of different—i.e., non-overlapping—frequency bands (spectra) 121, 122 for G.fast 171 and VDSL2 172, respectively, cf. FIG. 2. Each service 171, 172 has its own exclusive frequency band with some guard band between them. Typically, VDSL2 service 172 uses frequencies up to 17 MHz and G.fast service 171 starts a frequency of 20 MHz or 23 MHz and uses the spectrum up to 106 MHz. If VDSL2 service 172 uses frequencies up to 30 MHz, G.fast service 171 has to start above those. This approach avoids NEXT and FEXT between VDSL2 service 172 and G.fast service 172, but it causes a substantial reduction of the data rates of G.fast service 171, especially for longer transmission lines 151, e.g., having a line length of 200 m and more. This is because longer transmission lines 151 typically have a comparably high attenuation at higher frequencies. Therefore, only a narrow part of the G.fast service 171 spectrum 121 above the upper frequency of VDSL2 172 can be utilized by G.fast service causing the bit rates significantly reduced (cf. FIG. 2, middle part).

Figure 2:
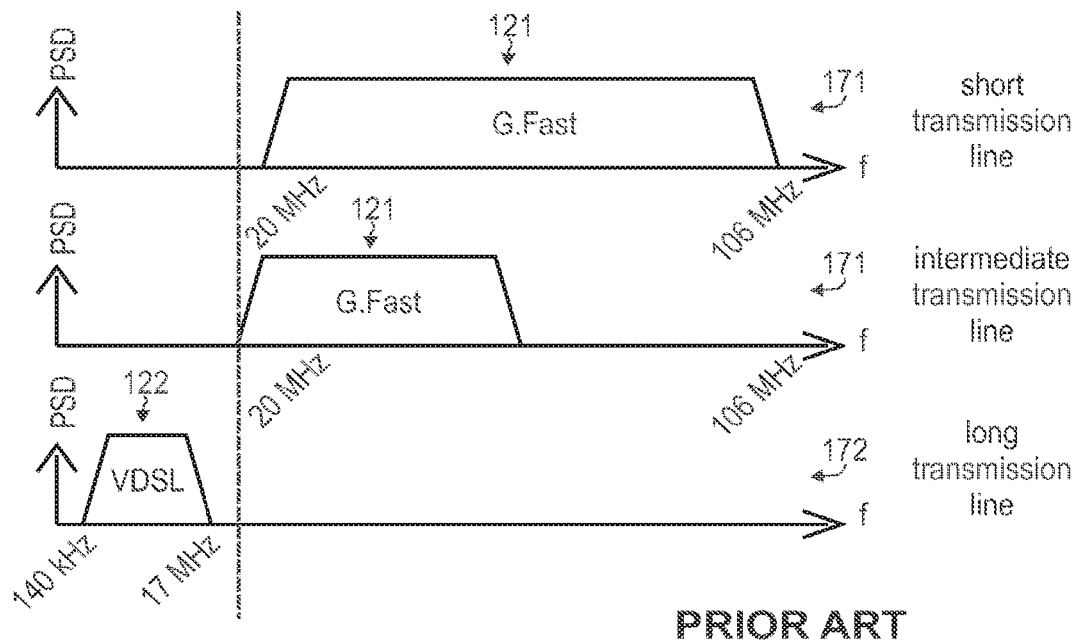
FIG. 2 schematically illustrates occupation of the spectrum when communicating via the first and second transmission lines of FIG. 1A according to reference implementations, wherein G.fast occupies a first spectrum and VDSL2 occupies a second spectrum, the first and second spectra being non-overlapping.

According to further reference implementations, data rates in the FTTC network are increased by using of the VDSL2 service 172 30 MHz profile; here the used frequencies are extended (not shown in FIG. 2). In such reference implementations, the transmission lines 152 of VDSL2 172 can use frequencies up to 35 MHz. However, for vectoring, the VDSL2 service 172 typically needs to be modified to be compatible to legacy 17 MHz vectored VDSL2 solutions. Besides, this approach provides a very small increase in the bit rates at shorter distances and cannot coexist with G.fast FTTdp architecture, because there is not enough alien crosstalk-free G.fast spectrum left.

By means of the techniques disclosed herein, various effects may be achieved. In some examples, extended reach of the G.fast service 171 deployed from FTTC is Implemented by usage of the frequency spectrum below 30 MHz—which is occupied as well by VDSL2 service—for G.fast service by means of crosstalk management that ensures coexistence with VDSL2 service 172. This application in some embodiments enables a G.fast service 171 with extended reach that can coexist with the existing (legacy) VDSL2 service 172 with no or minimal performance degradation of the VDSL2 service 172. The G.fast service 171 may be be deployed from regular VDSL2 street cabinets and may reach a sufficient percentage of the connected subscribers with a high-rate service.

With the proposed solution, subscribers connected with very long line lengths, which cannot be supported by the long reach G.fast service 171, are enabled to fall back to VDSL2 service 172; e.g., the VDSL2 service 172 may be provided from the same street cabinet. Subscribers with legacy CPE, which does not support G.fast service 171, are enabled to employ VDSL2 service 172, too. Subscribers that require upgraded service and connected with short and intermediate lines can be connected to G.fast service 171, e.g., with regular or extended reach.

To operate in the described environment, various techniques disclosed herein enable the G.fast service 171 to coexist with the VDSL2 service 172 that is, e.g., provided from the same street cabinet with mitigated crosstalk. Further, since the VDSL2 service 172 is typically a legacy FTTC deployment, introducing upgrades by using G.fast service 171 by relying on the techniques disclosed herein enables insignificant or no impact on the existing long-reach VDSL2 services 172.

Figure 3:
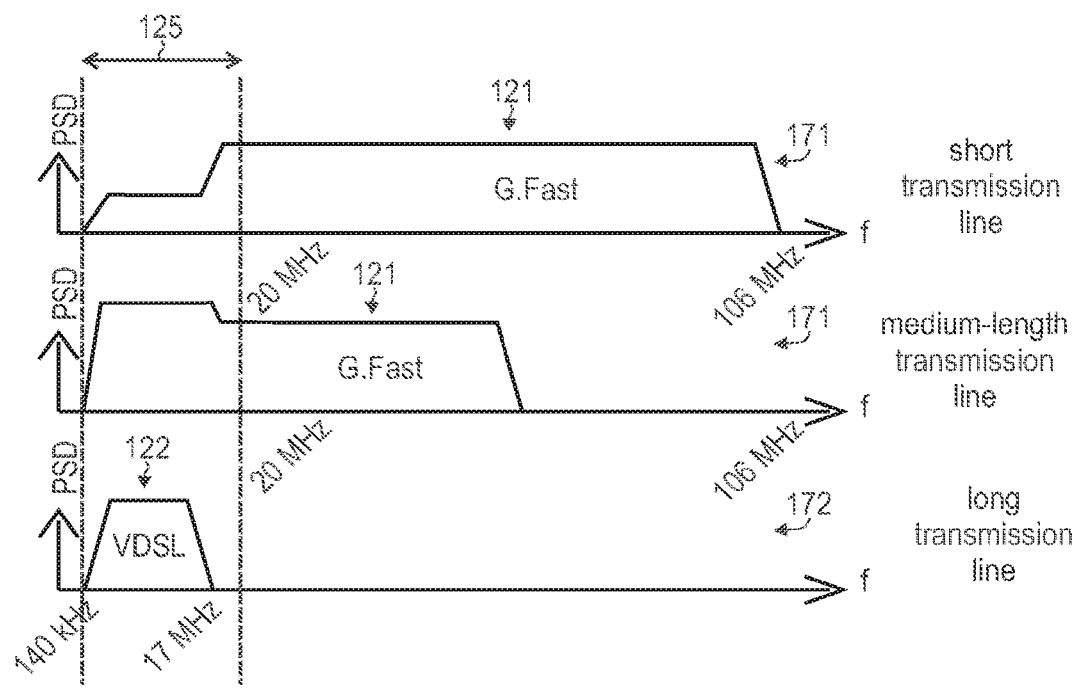
FIG. 3 schematically illustrates occupation of the spectrum when communicating via the first and second transmission lines of FIG. 1A according to various embodiments, wherein G.fast occupies a first spectrum and VDSL2 occupies a second spectrum, the first and second spectra being overlapping in an overlap spectrum.

FIG. 3 illustrates aspects of overlapping first and second frequency spectra 121, 122. In some embodiments, the extended G.fast reach is achieved by allowing the G.fast service 171 to use at least some of the frequencies utilized by the VDSL2 service 172, specifically from 2 MHz to 17 MHz, e.g., if 17 MHz-VDSL2 service 171 profile is used; and from 2 MHz to 30 MHz, if 30 MHz-VDSL2 service 172 profile is used. Thus, the first spectrum 121 of the G.fast service 171 and the second spectrum 122 of the VDSL2 service 172 both comprise an overlap spectrum 125, cf. FIG. 3. Guard bands that are typically employed in the prior art, e.g., between 17 MHz to 23 MHz in case of 17 MHz VDSL2 service 172, are not required in some scenarios. Reach-limiting parameters of the G.fast service 171, such as a cyclic prefix, are selected with respect to the extended maximum reach.

The overlap spectrum 125 causes the mutual crosstalk 161, 162. The mutual crosstalk 161, 162 may comprise alien NEXT and alien FEXT between VDSL2 and G.fast transmission lines 151, 152. E.g., unlike Asymmetric Digital Subscriber Line (ADSL) and VDSL2 services 172 using FDD—the G.fast service 172 uses s-TDD. Because of this, there is a typically strong NEXT between G.fast and VDSL2 services 171, 172, which is typically stronger than for the currently deployed coexisting ADSL and VDSL2 services 172. E.g., coexisting ADSL and VDSL2 services 172 may be predominantly characterized by FEXT.

In some scenarios, countermeasures are taken in order to avoid degradation of the service quality of communication according to the G.fast service 171 and/or according to the VDSL2 service 171. Such countermeasures mitigate the mutual crosstalk 161, 162. Such countermeasures may comprise maintaining link stability by a tailored startup sequence and adaptations on active links, i.e., during Showtime where payload data is communicated.

Such countermeasures may comprise using dynamic spectrum management for said communicating of the first data 131 according to the G.fast service 171. The dynamic spectrum management may set properties of spectrum allocation such as power spectral density (PSD), transmission power, and/or carrier bit loading, etc. (illustrated in FIG. 3 by a dependency of the PSD on the frequency for the G.fast spectrum 121). The dynamic spectrum management may allow for coexistence between G.fast service 171 and the VDSL2 service 172.

The NEXT and FEXT mitigation by the dynamic spectrum management may be based on the following ideas in some scenarios.

The dynamic spectrum management may detect frequencies in the overlap spectrum 125 on which NEXT and FEXT are sufficiently low, i.e., where the first transmission line 151 experiences a comparably small first crosstalk 161 and/or where the second transmission line 152 experiences a comparably small second crosstalk 162. For this, a value indicative of the noise level of the noise level associated with the first transmission line 151 is determined, e.g., a signal-to-noise (SNR). The SNR comprises at least the first crosstalk 161, i.e., NEXT and FEXT into the G.fast service 172. Then, depending on the value indicative of the noise level associated with the first transmission line 151, the dynamic spectrum management of the first spectrum 121 may be used.

The SNR may be determined individually for the G.fast transmission line 151, i.e., specific for the G.fast transmission line 151 and in contrast to noise associated with the VDSL2 transmission line 152. Different G.fast transmission lines 151 may have different determined SNR values.

According to the dynamic spectrum management, transceivers 101, 111 connected to long transmission lines 151 can, e.g., increase their transmission power at least in parts of the overlap spectrum 152 to gain sufficient reach—while transceivers 101, 111 connected to short transmission lines 151 can, e.g., reduce their transmission power in the overlap spectrum 152 to reduce the first crosstalk 171 from the G.fast transmission line 151 into the VDSL2 transmission line 152 (as illustrated in FIG. 3: compare upper part with medium part. In FIG. 3, the power spectral density (PSD) is plotted as function of frequency; the PSD is typically proportional to the transmission power). Thus, the dynamic spectrum management of the first spectrum 121 may depend on a line length of the G.fast transmission line 151. As such, it is possible that the value indicative of the noise level associated with the G.fast transmission line 151 is determined depending on the length of the G.fast transmission line 151.

Typically, due to the high dispersion of the NEXT and FEXT couplings in real cable transmission lines 151, 152, there are parts of the overlap spectrum 125 with relatively low crosstalk 161, 162 for each of the individual transmission lines 151, 152. It is possible that the G.fast transceivers 101, 111 are configured to determine the value indicative of the noise level associated with the G.fast transmission line 151 spectrally resolved for a plurality of frequencies arranged in the first spectrum 121. Here, different frequencies are treated differently. Then, it becomes possible to use the dynamic spectrum management spectrally resolved; e.g., by setting lower (higher) G.fast transmission powers outside (inside) the parts of the overlap spectrum 125 with relatively low crosstalk. This allows to increase an accuracy of crosstalk mitigation.

Such countermeasures in order to avoid degradation of the service quality of communication according to the G.fast service 171 and/or according to the VDSL2 service 171 may comprise, alternatively or additionally to the dynamic spectrum management, using a specific startup sequence for initializing communication via the G.fast transmission line 151 by setting certain properties of the G.fast service 171. To maintain stability of the VDSL2 transmission lines 152 in presence of alien crosstalk 162 from the G.fast transmission lines 151, the startup sequence of the G.fast service 171 is adapted such that the first crosstalk 171 into the VDSL2 transmission line 152 changes sufficiently slowly over time. Due to this, the VDSL2 services 172 can track these crosstalk changes and update their transmission settings without instabilities and service degradations. This allows to increase an accuracy of crosstalk mitigation.

Hereinafter, techniques implementing the dynamic spectrum management will be explained at greater detail hereinafter with reference to a transmission model. The transmission model according to examples is discussed hereinafter.

Figure 4:
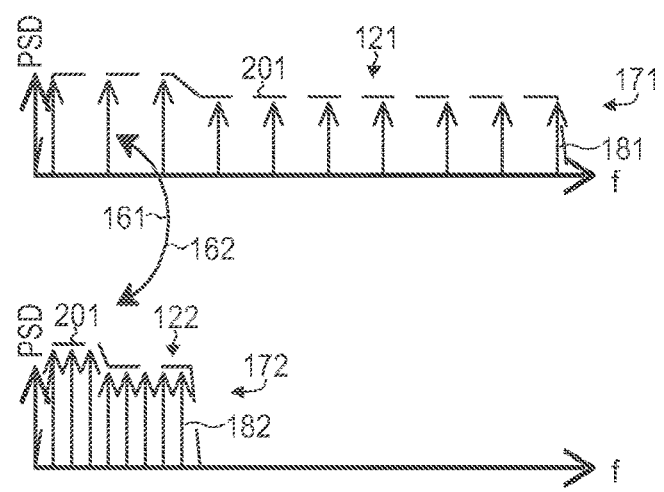
FIG. 4 illustrates at greater detail the first spectrum of said communicating via the first transmission line according to the G.fast service and the second spectrum of said communicating via the second transmission line according to the VDSL2 service.

FIG. 4 illustrates aspects regarding employing a plurality of carriers 181 for communicating the first data 131 according to the G.fast service 171 and the second data 132 according to the VDSL2 service, respectively. The G.fast service 171 is assumed to be a multi-carrier system with the carriers k=1, . . . , K and a number K of carriers 181. The use of multi-carrier system allows to configure and coordinate transmissions in every rather narrow part of the used frequency spectrum.

Each of the carriers 181 transmits with a power $x^{(k)}$. The power sum over all carriers is limited to a certain value $p_{sum}$ $$\sum_{k=1}^{K} x^{(k)} \le p_{sum}. \tag{1}$$

Furthermore, there is a spectral mask 201 defined which translates into an individual power limit for each carrier κ to be $$x^{(k)} \le p_{mask}^{(k)} \tag{2}$$

While the VDSL2 service 172 uses carriers 182 with smaller tone spacing, allocated at a lower frequency band 122, the G.fast service 171 uses a wider frequency band 121 with bigger spacing of the carriers 181. The maximum power of each individual carrier 181 in both services 171, 172 is limited by a spectral mask 201 (illustrated by the dashed line in FIG. 4).

The carriers have a bandwidth Δf (that is equal to the tone spacing used by multi-carrier system). As can be seen from Eqs. 1 and 2, the dynamic spectrum management is used spectrally resolved, i.e., for the various frequencies of the carriers 181.

There are multiple transmission lines l=1, ..., L 151, 152 which share one cable binder 155. There is crosstalk 161, 162 between the transmission lines 151, 162. Some of the transmission lines 151, 152 use the G.fast service 171 while others use the VDSL2 service 172. There are VDSL2 transmission lines 152 $\mathbb{I}_{legacy} \subset 1, \ldots, L$ using VDSL2 service 172 and G.fast transmission lines 151 $\mathbb{I}_{new} \subset 1, \ldots, L$, using G.fast service 171.

The overlap spectrum 125 causes the mutual crosstalk 161, 162. Further, the G.fast service 171 and the VDSL2 service 172 may use different duplexing schemes. The G.fast service employs S-TDD while the VDSL2 service 172 uses FDD. Therefore, there may be NEXT and FEXT 161, 162 between the services 171, 172. VDSL2 service 171 uses FDD for transmitting a power spectrum $PSD_{ds}(f)$ in the DS direction and $PSD_{us}(f)$ in the US direction.

The G.fast service 171 uses s-TDD and may use the same spectrum in both DS and US direction, flipping transmission direction in every transmitted frame.

Both, the VDSL2 service 172 and G.fast service 171 may apply self-FEXT cancelation to mitigate crosstalk within the group of transmission lines 151, 152 using the VDSL2 service 172 and within the group of lines using the G.fast service 171, respectively. However, this self-FEXT cancellation technique typically doesn't allow to mitigate mutual FEXT and NEXT crosstalk 161, 162 between VDSL2 and G.fast transmission lines 151, 152.

Figure 5:
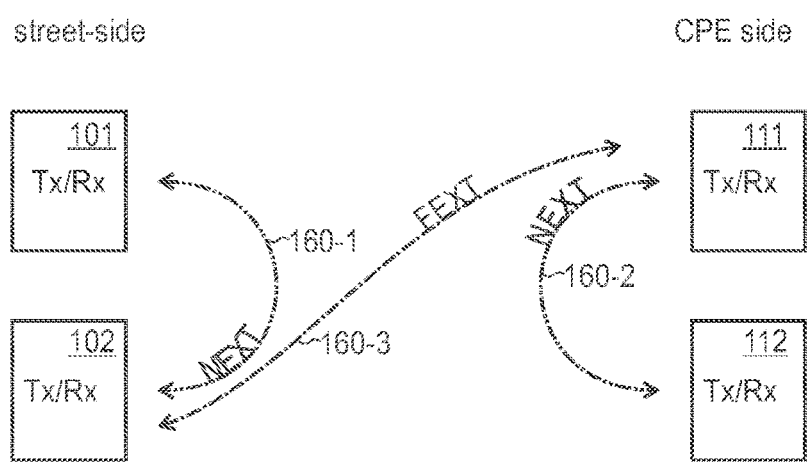
FIG. 5 illustrates the second crosstalk at greater detail, wherein in FIG. 5 near-end crosstalk and far-end crosstalk are illustrated.

Next, the mutual crosstalk 161, 162 and noise that may occur in some scenarios will be discussed. FIG. 5 shows the different coupling paths of crosstalk 161, 162 between the G.fast transmission line 151 and the VDSL2 transmission line 152. E.g., the crosstalk 161, 162 as illustrated in FIG. 5 may be experienced in the topology of FIG. 1B or 1C, i.e., scenarios where the transceivers 101, 102, 111, 112 are co-located or not co-located. The street-side NEXT 160-1 from the VDSL2 transmission line 152 into the G.fast transmission lines 151 is typically the strongest crosstalk 162; this may be regardless whether the G.fast transceiver 101 is deployed at a DP (cf. FIG. 1C) or at a street cabinet (cf. FIG. 1B). The FEXT couplings 160-3 between the transmission lines 151, 152, e.g., sourced from the DP and the street cabinet, are typically much weaker; the same is true for the NEXT coupling 160-2 at the CPE side.

Typically, the G.fast service 171 transmission power is much lower than the VDSL2 service 172 transmission power. E.g., for G.fast service 171, a transmission power corresponding to a SNR of 60 dB may be selected. Therefore, first crosstalk 161 from the G.fast transmission line 151 into the VDSL2 transmission line 152 is typically lower than the second crosstalk 162 from the VDSL2 transmission line 152 into the G.fast transmission line 151 in the overlap spectrum 125.

TABLE 1

Crosstalk Couplings

| VICTIM | DISTURBER | | | |
|---|---|---|---|---|
| | G.FAST DP 101 | VDSL2 CABINET 102 | G.FAST CPE 111 | VDSL2 CPE 112 |
| G.FAST DP 101 | — | NEXT 162, medium | canceled | FEXT 162, weak |
| VDSL2 CABINET 102 | NEXT 161, strong | — | medium | FEXT 161, — |
| G.FAST CPE 111 | canceled | FEXT 162, weak | — | NEXT 162, weak |
| VDSL2 CPE 112 | FEXT 161, medium | canceled | NEXT 161, weak | — |

Table 1 summarizes the crosstalk 161, 162 in the scenario of FIG. 5 where, e.g., the G.fast transceiver 101 is co-located with the VDSL2 transceiver 102. Table 1 gives an indication on the strength of the disturbance. This summary indicates for a practical case in which the G.fast service 171 transmit level is at least 15 dB lower than transmit level of the VDSL2 service 172. Then, there is the critical path which is the NEXT 161 from the VDSL2 cabinet DS signal into the G.fast DP US receiver 101.

There is NEXT crosstalk 161 $H_{NEXT\ dp\ ij}(f)$ from VDSL2 transmission lines 152 into the G.fast transmission lines 151 at the DP-side; this is comparably strong. Furthermore, there is NEXT crosstalk 161 between VDSL2 transmission lines 152 and G.fast transmission lines 151 at the CPE side $H_{NLXT\ cpe\ ij}(f)$; this is comparably weaker, because the CPE-side transceivers 111, 112 are not co-located. Then, there is FEXT crosstalk 162 from the VDSL2 transmission lines 152 into the G.fast transmission lines 151 $H_{FEXT\ ds\ ij}(f)$ in DS direction and $H_{FEXT\ us\ ij}(f)$ in US. Those are categorized weaker than the NEXT couplings.

At each G.fast receiver 101, 111, there is also background noise with a noise power $\sigma^2$.

Besides that, the CPE-side G.fast receiver 111 experiences alien FEXT from the VDSL2 lines.

The DS alien FEXT 161 for carrier k 181 in a G.fast transmission line 151 $l \in \mathbb{I}_{new}$ is given by $$p_{fext\,ds\,l}^{(k)} = \sum_{d \in \mathbb{I}_{legacy}} \left( \int_{k\Delta f - \Delta f/2}^{k\Delta f + \Delta f/2} |H_{FEXT ds\,ld}(f)|^2 PSD_{ds}(f) df \right). \quad (3)$$

The G.fast service 171 DS communication also experiences NEXT 161 from the US communication via the VDSL2 transmission line 152, i.e., from the CPE transceiver 112:

$$p_{next\,ds\,l}^{(k)} = \sum_{d \in \mathbb{I}_{legacy}} \left( \int_{k\Delta f - \Delta f/2}^{k\Delta f + \Delta f/2} |H_{NEXTcpe\,ld}(f)|^2 PSD_{us}(f) df \right). \quad (4)$$

The G.fast service 171 US communication experiences FEXT 161 from the VDSL2 transmission line 152, i.e., from the CPE transceiver 112, in US:

$$p_{fext\,us\,l}^{(k)} = \sum_{d \in \mathbb{I}_{legacy}} \left( \int_{k\Delta f - \Delta f/2}^{k\Delta f + \Delta f/2} |H_{FEXT\,us\,ld}(f)|^2 PSD_{us}(f) df \right) \quad (5)$$

and NEXT 161 from the VDSL2 transmission line 152 at the G.fast US transceiver 101 (which is typically the strongest crosstalk component):

$$p_{next\ us\ l}^{(k)} = \sum_{d \in legacy} \left( \int_{k\Delta f - \Delta f/2}^{k\Delta f + \Delta f/2} |H_{NEXT\ dp\ ld}(f)|^2 PSD_{ds}(f) df \right). \quad (6)$$

The self-FEXT, which comes from transmission lines 151, 152 which are of the same service 171, 172, i.e., VDSL2-to-VDSL2 and G.fast-to-G.fast, is assumed to be compensated by crosstalk cancelation used by both VDSL2 service 172 and G.fast service 171. Self-NEXT in G.fast service 171 and in VDSL2 service 172 does not occur due to selected duplexing method, i.e., s-TDD for G.fast service 171 and FDD for VDSL2 service 172.

Some embodiments use the dynamic spectrum management. The dynamic spectrum management can be based on noise levels which comprise at least the first crosstalk 161 as indicated by Eqs. 3-6. The dynamic spectrum management enables mitigation of alien crosstalk 161 in the mixed G.fast/VDSL2 system.

In detail, as the value indicative of the noise level associated with the G.fast transmission line 151, the G.fast receiver 101, 111 can measure its background noise which comprises the receiver's 101, 111 own noise floor and alien crosstalk 161. The self-crosstalk from other G.fast transmission lines 151 is compensated and thus is not reflected in the noise measurement. The DS background noise of interest for the G.fast CPE receiver 111, for the carrier k 181 and transmission line l 151 is given by:

$$p_{noise\ ds\ l} = \sigma^2 + p_{fext\ dsl}^{(k)} + p_{next\ ds\ l}^{(k)} \quad (7)$$

which comprises the three components: the receiver noise $\sigma^2$, the alien NEXT $p_{next\ ds\ l}^{(k)}$ 161 and the alien FEXT $p_{fext\ ds\ l}^{(k)}$ 161 from the VDSL2 transmission lines 152. Similarly, the US background noise is given by:

$$p_{noise\ us\ l} = \sigma^2 + p_{fext\ us\ l}^{(k)} + p_{next\ us\ l}^{(k)} \quad (8)$$

Such values indicative of the noise level as given by Eqs. 7 and 8 can be used by the dynamic spectrum management.

Figure 6A:
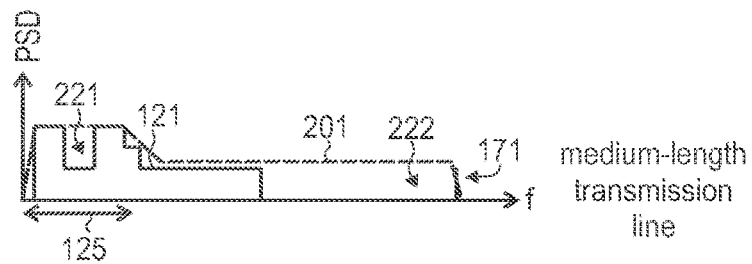
FIG. 6A illustrates at greater detail the first spectrum of said communicating via the first transmission line according to the G.fast service according to various embodiments.

First, power limits and transmitter capabilities are discussed with respect to FIG. 6A. Using of the dynamic spectrum management comprises for each one of the plurality of carriers 181: depending on the determined noise level associated with the G.fast transmission line 151, selecting a transmission power of transmitting on the G.fast transmission line 151.

Various techniques of selecting the transmission power are conceivable which may be applied in isolation or any combination. E.g., at the low frequencies, due to the comparably longer line length, the transmission power may be comparably high to achieve reasonable data rates. Some parts of the low frequency overlap spectrum 125 may be reduced 221 due to high alien crosstalk 161, 162 as indicated by the determined SNR, see Eqs. 7 and 8. The high frequencies may not be used, because the background noise can be high. E.g., for carriers 181 with higher signal-to-noise ratio, the transmission power can be reduced without performance impact. For this, the spectral mask 201 can be employed. The power limits of interest may be the per-line sum-power as described in Eq. 1 and the spectral mask 201 (indicated by the dashed line in FIG. 6A) as shown in Eq. 2. For dynamic spectrum management, the spectral mask $p_{mask}$ 201 may be modified to take the transmitter capabilities of a maximum usable SNR into account.

In some scenarios, the first data 131 may be communicated via the G.fast transmission line 151 employing the plurality of carriers 181. Using the dynamic spectrum management may comprise for each one of the plurality of carriers 181: depending on the determined value indicative of the noise level of the G.fast transmission line 151, selecting a respective number of allocated bits of said communicating via the G.fast transmission line 151. This may correspond to bit loading per carrier. The number of bits to be transmitted over one carrier 181 is typically limited because of the maximum size of the modulation alphabet. For VDSL2 service 172, a maximum of fifteen bits per carrier 181 can be loaded; and for G.fast service 171 it is a maximum of twelve bits per carrier 181. The number of bits to be loaded on a carrier 181 is selected with respect to the SNR associated with the G.fast transmission line 151. The latter means that there is a maximum SNR value which there is no reason to exceed for data transmission. In case that the SNR of a carrier 118 exceeds the maximum SNR, the data rate cannot be increased. For the dynamic spectrum management, this means that there is a cap on the SNR value which is subject to optimization. For carriers 181 that reach higher SNR, the transmission power can be reduced without performance impact. For the dynamic spectrum management, this is translates into a second per-line transmission power limit $p_{bmax}$ 201.

$$x^{(k)} \leq p_{bmax}^{(k)}. \quad (9)$$

E.g., to determine the spectral mask 201, the minimum of the two power limits of Eqs. 2 and 9 may be selected, e.g., for each carrier 181.

In some scenarios, said selecting of the transmission power of said transmitting on the G.fast transmission line 151 depends on a water-filling algorithm. Various aspects with respect to the water filling algorithm are illustrated in FIG. 6B.

The water-filling algorithm is used to determine the transmission power allocation. For general principles of the water-filling algorithm, reference is made to W. Yu, W. Rhee, S. Boyd, and J. M. Cioffi. Iterative water-filling for Gaussian vector multiple-access channels. Information Theory, IEEE Transactions on, 50(1):145-152, 2004.

For the water-filling algorithm, three groups of carriers 181 are identified. There are carriers 181 with zero transmission power $\mathbb{I}_{zero} \subset 1, \ldots, K$, carriers 181 which are limited by the spectral mask 201 $\mathbb{I}_{mask} \in 1, \ldots, K$ and carriers 181 which are limited by the per-line sum-power $p_{sum}$ $\mathbb{I}_{wf} \subset 1, \ldots, K$ where the actual transmission power is determined by the water-filling algorithm. The per-line sum-power thus represents an integral upper threshold across the plurality of carriers 181.

Figure 6B:
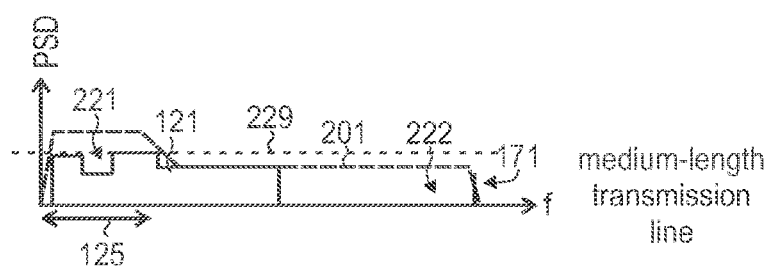
FIG. 6B illustrates at greater detail the first spectrum of said communicating via the first transmission line according to the G.fast service according to various embodiments.

Furthermore, there is a water level $\mu$ 229, cf. FIG. 6B, which is given by:

$$\mu_l = \frac{1}{|\mathbb{I}_{wf}|} \left( \sum_{k=1}^{K} p_{noise\ l}^{(k)} + p_{sum} - \sum_{k \in \mathbb{I}_{mask}} \min\left(p_{mask}^{(k)}, p_{bmax}^{(k)}\right) \right) \quad (10)$$

where $|\mathbb{I}_{wf}|$ is the number of carriers 181 which are limited by the sum-power. For downstream direction the downstream noise $p_{noise\ ds\ l}$ is used and for upstream direction the upstream noise $p_{noise\ us\ l}$ is used in Eq. (10).

The actual transmission power for carrier k 181 is then determined by $$x_l^{(k)} = \begin{cases} 0 & \text{for } k \in \mathbb{I}_{zero} \\ \min(p_{mask}^{(k)}, p_{bmax}^{(k)}) & \text{for } k \in \mathbb{I}_{mask} \\ \mu - p_{noise\,l}^{(k)} & \text{for } k \in \mathbb{I}_{wf} \end{cases} \quad (11)$$

The carriers 181 are moved from the water-filling group into the zero group if the noise is higher than the level μ and they are moved into the mask limited set if the calculated transmission power is higher than the mask 201.

While in the scenario of FIGS. 6A, 6B various examples are disclosed with respect to medium-length G.fast transmission lines 151, similar techniques may be readily employed to longer or short G.fast transmission lines 151.

Next, with respect to FIG. 7, power back-off will be discussed. The power back-off mechanism may be applied alternatively or additionally to the techniques disclosed with respect to the scenarios of FIGS. 6A and 6B.

Power back-off may be employed, in particular, for short transmission lines 151. In some scenarios, a power back-off technique is used for G.fast. The power back-off technique may be used in DS as well as in US direction within the overlap spectrum 125. The power back-off mainly protects the US VDSL2 service 172, but also the DS VDSL2 service 172. In certain examples, the power back-off is implemented on the G.fast service 171 only. The power back-off may not be implemented for the VDSL2 service 172. This enables backwards compatibility with existing VDSL2 services 172.

Figure 7:
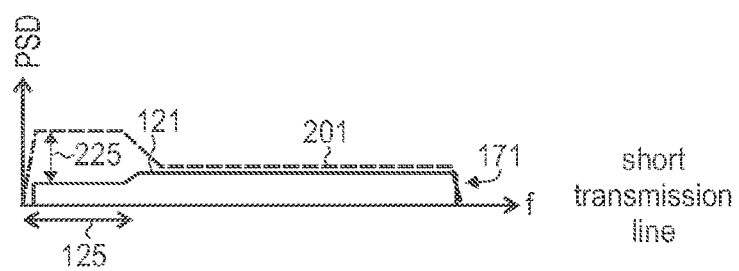
FIG. 7 illustrates at greater detail the first spectrum of said communicating via the first transmission line according to various embodiments.

FIG. 7 gives an example of the transmit spectrum for a short line length of the G.fast transmission line 151. At lower frequencies in the overlap spectrum 125, the transmission power of transmitting on the G.fast transmission line 151 is reduced to protect the VDSL2 transmission lines 151. The higher frequencies can be used for data transmission, because the SNR is sufficiently high. Reduction of the transmission power is implement by a power back-off mechanism providing a power back-off 225. The power back-off 225 sets an upper threshold of the transmission power. The power back-off 225 may be determined depending on the line length G.fast transmission line 151. The value indicative of the noise level associated with the G.fast transmission line 151 may be determined depending on the length of the G.fast transmission line 151. In some scenarios, the value indicative of the noise level associated with the G.fast transmission line 151 may be proportional to the line length of the G.fast transmission line 151. Here, the upper threshold—given by the power back-off 225—may be determined based on a corresponding value indicative of the noise level associated with the G.fast transmission line 151. E.g., the power back-off 225 may be independent of the background noise. The power back-off 225 may be derived from information on the line length of the G.Fast transmission line 151 and/or the VDSL2 transmission line 152 and/or knowledge on the VDSL2 spectrum 122.

The disclosed power back-off mechanism may be seen as a trade-off between protection of VDSL2 transmission lines 152 and optimized data rates for longer G.fast transmission lines 151. Therefore, more power reduction 225 is applied to the shorter line lengths of the G.fast transmission lines 151 (cf. FIG. 7), while for long line lengths there may be no or no significant power back-off 225 (cf. FIGS. 6A, 6B). The shorter G.fast lines may have more capacity than required for the subscriber service.

Hereinafter, quantitative examples regarding the power back-off 225 are given. For G.fast transmission lines 151 which are longer than a maximum length $d_{back-off}$, the back-off 225 may be zero dB. For shorter G.fast transmission lines 151, there may be a power back-off mask $p_{backoff}$ (f,d) which depends on frequency and the line length d of the disturber line.

One example is a flat back-off mask, with a certain maximum back-off value $p_{bomax}$ 225 in dB.

$$p_{back\text{-}off}(f, d) = \begin{cases} 0 & \text{for } f > f_{max\,legacy} \text{ or } d > d_{back\text{-}off} \\ (d - d_{back\text{-}off}) \frac{p_{bomax}}{d_{back\text{-}off}} & \text{otherwise} \end{cases} \quad (12)$$

$d_{back-off}$ denotes a threshold length of a G.fast transmission line 151 where power back-off shall be applied. This type of power back-off is used also used for the US, but with different values of $p_{bomax}$. Power back-off in the US allows to reduce mutual upstream FEXT and the NEXT crosstalk 162 from G.fast CPE transceiver 111 into VDSL2 CPE transceiver 112.

The actual power limit from $p_{mask}$ then consists of two parts, the absolute mask defined by regulation $p_{regulation}(f)$, i.e., a power limit imposed by the ITU-G 9700 standard, and a relative back-off value $p_{back-off}(f,d)$ 225 to be $$p_{mask}(d,f)\,[dB] = p_{regulation}(f)\,[dB] + p_{back\text{-}off}(f,d)\,[dB] \quad (13)$$

Figure 8:
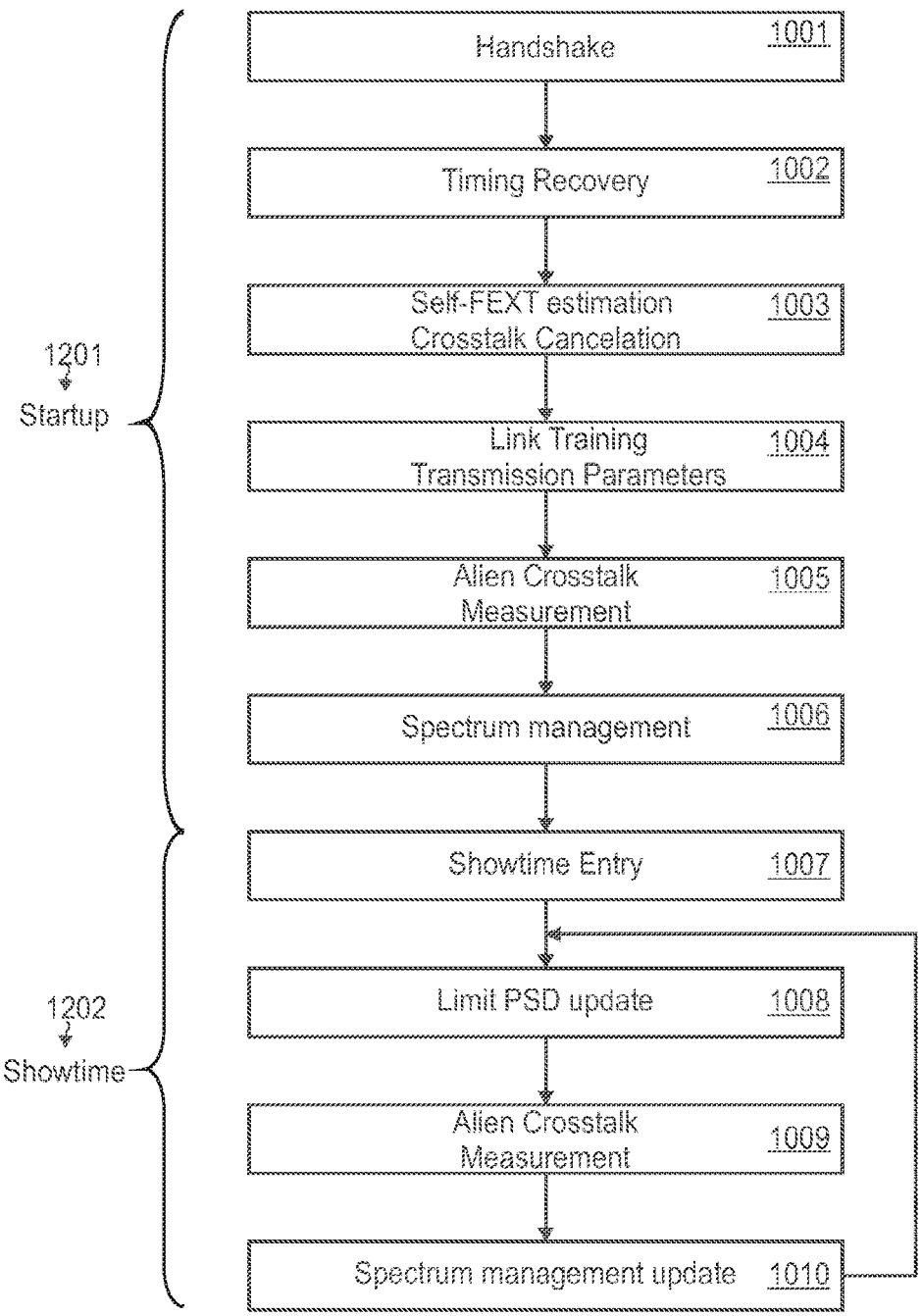
FIG. 8 is a flowchart of a method according to various embodiments.

Alternatively or additionally to the spectrum management which is employed to increase reach and data rate of the G.fast service 171, a modified startup sequence for the G.fast transmission lines 151 may be employed to maintain stability of the G.fast communication. The startup sequence may enable to measure relevant system parameters to optimize the transmit parameters in some embodiments. Aspects of the startup sequence are illustrated in FIG. 8.

The startup sequence of a vectoring-enabled wireline communication, e.g., according to the G.fast service 171, may comprise all or some of the following steps. They may be arranged differently, extended or reduced.

1001-1006 correspond to a startup sequence 1201 that is executed prior to communicating higher-layer data 131 via the G.fast transmission line 151. Then, Showtime 1202 is executed and higher-layer data 131 is communicated via the G.fast transmission line 151. It is possible that during, both, 1201 and 1202, communication via the VDSL transmission line 152 operates in Showtime, i.e., higher-layer data 132 is transmitted via the VDSL transmission line 152.

1001: Handshake: Identify the service to be used, e.g., G.994.1 handshake for the G.fast service 171.

1002: Timing recovery. Differences of clocks and symbol frequencies can be reduced. Loop timing detection and recovery, synchronize transmitter and receiver.

1003: Crosstalk cancellation into other G.fast transmission lines 151. I.e., self-crosstalk can be reduced. Here self-FEXT channels can be measured and canceled.

1004: Communication via the G.fast transmission line 151 is trained. Transmission parameters are set.

1005: Measurement of crosstalk 162 from other lines. For details, see below.

1006: Link training and dynamic spectrum optimization. Here, transmission parameters can be set. This may affect the set of used subcarriers and setting of the transmission power.

1007: Showtime entry is performed. This includes exchange capabilities and negotiation parameters of the upper sub-layers to facilitate data communication. Then, Showtime 1202 commences where data transmission of higher-layer payload data takes place. Here, conservative power in the overlap spectrum 125 is used.

For the support of coexistence with the VDSL2 service 172, in some embodiments G.fast service 171 initializes in a protection mode such that communicating of the higher layer data 132 via the VDSL2 transmission line 152 experiences reduced crosstalk from the G.fast transmission line 151, said reduced crosstalk being smaller than the second crosstalk 162. Thus, during the startup sequence, the protection mode may be enabled. The protection mode may comprise various countermeasures against crosstalk into VDSL2 transmission lines 152, e.g., reduced transmission power, reduced bit loading, reduced transmission power in the overlap spectrum 125, reduced bit loading in the overlap spectrum 125, etc.

E.g., during the training period 1201 the transmission power of transmitting on the G.fast transmission line 151 may be set to a predefined lower threshold. E.g., the predefined lower threshold may be zero. E.g., in the protection mode for transmission only the non-overlapped part of the G.fast spectrum 121 may be used. In some scenarios, it is also possible to apply conservative low transmission powers in the overlap spectrum 125 for transmitting on the G.fast transmission line 151, e.g., for monitoring purposes. E.g., the transmission power of transmitting on the G.fast transmission line 151 may uses zero power in the VDSL2 spectrum 122 and normal transmission power in the spectrum above the VDSL2 spectrum 122. E.g., 1002, 1003, and/or 1004 may be executed outside the overlap spectrum 125. For carriers k where $k\Delta f \leq f_{max\ legacy}$, the spectral mask 201 is substantially reduced to a limit $p_{max\ training}$ or less.

Details of the alien crosstalk measurement according to step 1005 discussed next. In some embodiments the NEXT and FEXT crosstalk 161 from VDSL2 transmission lines 152 into the respective G.fast transmission line 151 is evaluated. In the overlap spectrum 125, self-FEXT from G.fast transmission lines 151 may be present, because at 1003 the G.fast transmission lines 151 may use, as explained above, a reduced transmission power at the predefined lower threshold to train crosstalk cancelation in the overlap spectrum 125 which may reduce the quality of self-FEXT cancelation.

Hereinafter, techniques are disclosed which enable the measurement in presence of self-FEXT from other G.fast transmission lines 151. For this, during the training period 1201, training data can be communicated in the overlap spectrum 125 and via the G.fast transmission line 151. Based on said communicating of the training data, the value indicative of the noise level associated with the G.fast transmission line 151 may be determined, i.e., the SNR. In particular, the first crosstalk 161 may be determined.

The SNR measurement may be performed using an orthogonal code or training data to cancel self-FEXT from the measurement. The orthogonally coded training data is used for channel estimation in G.fast services 171. Assuming that the orthogonal code comprises a number T symbols and it comprises the values +1, −1 and 0. The sequence is repeated K times. For transmission line l, the sequence $u_l^{[t]}$ is transmitted at time t. The receiver receives a symbol $\hat{u}_l^{[t]}$, which is scaled to be in the same range as the transmitted signal. The receiver error e is defined as $$e^{[t]} = \hat{u}^{[t]} - u^{[t]}. \tag{14}$$

The alien crosstalk variance $p_{noise\ l}$ by averaging over K sequences according to $$p_{noise\ l} = \frac{1}{K} \sum_{k=1}^{K} \sum_{t=1}^{T} |u^{[t]}| \left| \sum_{t=1}^{T} (e^{[t]} u^{[t]}) \right|^2. \tag{15}$$

This method cancels out self-FEXT from other G.fast lines, but keeps alien crosstalk and background noise.

Alternatively or additionally, for SNR measurement at 1005, a quiet phase may be implemented. Here, none of the G.fast transmitters 101, 111 may transmit data and the receiver 101, 111 can measure the alien noise. To facilitate this measurement, in some embodiments the number of transmit data symbols during the G.fast startup sequence 1201 is limited, so not all the transmission time is used. At the same time, few symbol positions are temporary released from transmission in all active G.fast transmission lines 151. In the formed this way a temporary transmission time gap, background noise is effectively measured.

The transmission power in the overlap spectrum 125 can be further optimized during the Showtime 1202, e.g., by 1008, 1009, 1010. E.g., after entering Showtime 1202, the optimization of the transmission power may be executed, 1008-1010. In some examples, the transmission power for G.fast transmission via the G.fast transmission line 151 in the overlap spectrum 125 may be gradually increased or raised, e.g., using on-line reconfiguration methods. Thus, additional capacity is loaded, thus increasing G.fast bit rate.

While performing 1008-1010, a Showtime power adjustment procedure is applied to the VDSL2 service 171 for communicating via the VDSL2 transmission lines 152. This Showtime power adjustment procedure may increase transmission power levels at the VDSL2 spectrum 122.

Sudden changes of the noise environment due to a substantial power increase of the G.fast spectrum 121 may cause bit errors and link drops of the VDSL2 transmission lines 152. To avoid that, the G.fast transmission power is increased step-by-step—at least in the overlap spectrum 125—until the full performance is achieved, 1010. The limit value $p_{training}(f,l)$ is increased step-by-step until it reaches the original limit mask $p_{mask}$.

After each update step, a wait time is required to let the legacy service adapt to the new noise environment, 1008. The power update may be communicated between the transceivers 101, 111 of the G.fast transmission line 151, e.g., from the street cabinet or DP to the CPE. The power updates may be implemented for US and DS transmission.

The alien crosstalk measurement of 1005 may be repeated at 1009 to appropriately set the transmission power at 1010. It may be possible to employ different techniques to measure the alien crosstalk during Showtime 1202 at 1009. E.g., specific training symbols may be defined and a quiet phase may be implemented. Here, the far-end transmitter 111 may be quiet and the receiver 101 may measure the remaining signal on the transmission line 151. Alternatively or additionally, the receiver 101 may calculate the difference between the received signal and the received constellation point after error correction and decoding/receive error; an average over the squared receive error can be implemented, see Eq. 14. At 1010, also the bit loading per carrier 181 of the G.fast transmission line 151 may be adjusted.

The gradual increase of the transmission power may be expressed as:

$$p_{training}(f, t) = \begin{cases} 0 & \text{for } f > f_{max\ legacy} \text{ or } t > t_{tmax} \\ (t - t_{tmax}) \dfrac{p_{tmax}}{t_{tmax}} & \text{otherwise} \end{cases} \tag{16}$$

With this additional PSD update tool, the final limit mask is given by $$p_{mask}(d,f,t) \text{ [dB]} = p_{regulation}(f) \text{ [dB]} + p_{back-off}(f,d)$$
$$\text{[dB]} + p_{training}(f,t) \text{ [dB]} \quad (17)$$

Next, central management for G.fast and VDSL2 according to some embodiments will be discussed. In some deployment cases, the G.fast and the VDSL2 service are served from the same street cabinet, cf. FIG. 1B. Therefore, coordination between the G.fast and VDSL2 transmission lines 151, 152 is possible. In some embodiments, an extended startup sequence 1201 as illustrated in FIG. 8 may be employed. In some examples, prior to initialization of the G.fast communication, the G.fast service 171 estimates the second crosstalk 162 from the G.fast transmission line 151 and VDSL2 lines 152. For that, prior G.fast Showtime 1202, the G.fast DS transceiver 101 starts transmission of VDSL2 synchronization symbols, e.g., modulated by appropriate pilot sequence using either all relevant VDSL2 carriers 181 in the overlap spectrum 125 or only carriers 181 in a certain part of the overlap spectrum 125. One implementation employs G.fast startup sequence 1201 using the protection mode. Here, only a few initialization signals are communicated in the overlap spectrum 125; these may include the O-P-VECTOR 1 signal that allows legacy VDSL2 transmission lines 151 to estimate the second crosstalk 162 from the G.fast transmission line 151 to the VDSL2 transmission lines 152; it may be possible that, beyond these initialization signals no further signals are communicated via the G.Fast transmission line 151 in the overlap spectrum 125. Further, if future stages of VDSL2 initialization are possible, the G.fast US transmitter 101 may perform the same action, i.e., transmit VDSL2 sync symbols modulated by appropriate pilot sequence.

Based on such techniques, it is thus possible to determine noise level associated with the second transmission line 152 and comprising at least the second crosstalk 162. This value may be reported to the G.fast transceiver 101, 111. E.g., a VDSL2 management system reports this measured crosstalk 162, making it available to the initializing G.fast transmission line 151. The G.fast transmission line 151 uses the value of the measured crosstalk 162 to setup the initial transmission power of transmitting on the G.fast line 151 in US and/or DS, i.e., setting the predefined lower threshold. Thereby, a predefined lower threshold may be determined which is suitable for coexistence between G.fast and VDSL2 transmission lines 151, 152.

Alternatively or additionally to such techniques, the predefined lower threshold may be set it to a comparably low level and then raised using multiple steps.

Next, adding a new G.fast transmission line 151 to the vectored group will be discussed.

In systems with central management, there are additional techniques conceivable to make VDSL2 transmission lines 152 robust against startup of G.fast transmission lines 152. The G.fast transmission lines 151 may initialize the startup sequence 1201 with higher transmission powers at the overlap spectrum 125, but the VDSL2 transmission lines 152 are made robust against the second crosstalk 162 from G.fast transmission lines 152 by adding Showtime adaptive virtual noise (SAVN) that is applied in advance to the start of a G.fast transmission line 151. In such cases, a comparably high predefined lower threshold may be chosen.

The VDSL2 transmission lines 152 update their data rates and gains according to the adaptive virtual noise such that they are protected against the crosstalk 162 from the joining process. After training has finished, the adaptive virtual noise can be reduced have the full performance of the VDSL2 transmission line 152.

Next, adding a new VDSL2 transmission line 152 to a vectored group will be discussed.

When a new VDSL2 transmission line 152 is added, it will generate excessive first crosstalk 161 into G.fast transmission lines 151. Additionally, performance of the new VDSL2 transmission line 152 may be limited due to presence of alien crosstalk 161 from the G.fast transmission lines 151. To avoid the mentioned instability of G.fast transmission lines 151, an extra noise margin may be applied to the G.fast transmission lines 151. However, this may reduce the overall G.fast performance. Alternatively or additionally, the G.fast transmission line 151 can update temporarily the SAVN so that the bit loading over the overlap spectrum 125 is comparably conservative. This may also be combined with reduction of the transmission power of communicating on the G.fast transmission lines 151 in the overlap spectrum 151. After the new VDSL2 transmission line 152 initializes, the above mentioned mutual transmission power optimization according to 1008-1010 may be used to gradually increase the transmission power and the bit loading of the G.fast transmission line 151 in the overlap spectrum 125.

Figure 9:
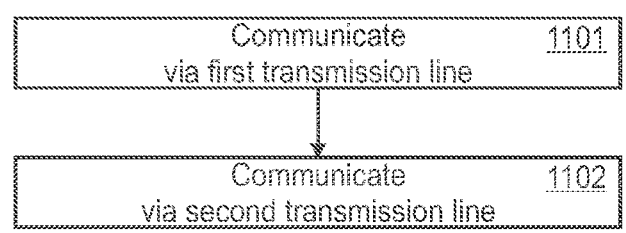
FIG. 9 is a flowchart of a method according to various embodiments.

FIG. 9 illustrates a method according to various embodiments.

At 1101, communication via the first transmission line 151, e.g., the G.fast transmission line, is executed.

At 1102, communication via the second transmission line 152, e.g., the VDSL2 transmission line, is executed. 1101 and 1102 may be executed in parallel and both occupy an overlap spectrum 125.

Summarizing, above techniques of coexistence between a FDD and a TDD duplexing scheme for communicating in overlapping spectra have been illustrated. In some embodiments, transmission power shaping according to dynamic spectrum management mitigates crosstalk. In some embodiments, a power-reduced startup sequence mitigates crosstalk.

Such techniques can be particularly employed for data transmission of G.fast and VDSL2. Crosstalk from VDSL2 transmission lines into G.fast transmission lines may be evaluated individually for each disturbing VDSL2 transmission line at the overlap spectrum. In particular, the line length of the disturber line may be taken into account. Alternatively or additionally, crosstalk from G.fast transmission lines into the VDSL2 transmission lines may be evaluated using a tailored G.fast startup sequence including transmission of VDSL2 synchronization symbols.

The startup protocol of G.fast may be supplemented by a crosstalk estimation step for determining alien crosstalk from VDSL2 transmission lines. The startup protocol of G.fast may use a protection mode; here the transmission power in the overlap spectrum may be reduced or set to zero to avoid instabilities of the VDSL2 transmission lines. During startup of G.fast, a fall-back into VDSL2 may be employed; here, VDSL2 synchronization symbols may be communicated via the G.fast transmission line. This allows to determine the crosstalk from the G.fast transmission line into the VDSL2 transmission line. During initialization of a new VDSL2 or G.fast transmission line, SAVN may be applied to the existing transmission line.

Later, during Showtime, the transmission power for transmitting on the G.fast transmission line in the overlap spectrum is increased, e.g., gradually. Here, a length-dependent power back-off may be employed to protect the VDSL2 transmission lines.

Although the invention has been shown and described with respect to certain preferred embodiments, equivalents and modifications will occur to others skilled in the art upon the reading and understanding of the specification. The present invention Includes all such equivalents and modifications and is limited only by the scope of the appended claims.

The invention claimed is:

1. A method, comprising:
communicating, in a first spectrum and via a first transmission line, first data according to a time-division duplexing scheme,
communicating, in a second spectrum and via a second transmission line, second data according to a frequency-division duplexing scheme,
wherein the first spectrum and second spectrum both comprise an overlap spectrum,
wherein the first transmission line experiences first crosstalk from the second transmission line,
wherein the second transmission line experiences second crosstalk from the first transmission line,
the method further comprising:
determining a value indicative of a noise level associated with the first transmission line, said value indicative of the noise level associated with the first transmission line comprising at least the first crosstalk,
for said communicating of the first data, using dynamic spectrum management of the first spectrum depending on the value indicative of the noise level associated with the first transmission line,
wherein the first data is communicated employing a plurality of carriers arranged in the first spectrum,
wherein said value indicative of the noise level associated with the first transmission line is determined depending on a length of the first transmission line,
wherein the method further comprises, for each one of the plurality of carriers, determining a respective upper threshold of a transmission power of transmitting on the first transmission line depending on the value indicative of the noise level associated with the first transmission line.

2. The method of claim 1,
wherein the first data is communicated employing a plurality of carriers arranged in the first spectrum,
wherein said using of the dynamic spectrum management comprises:
for each one of the plurality of carriers: depending on the determined value indicative of the noise level associated with the first transmission line, selecting a respective number of allocated bits of said communicating of the first data.

3. The method of claim 1,
wherein said using of the dynamic spectrum management comprises:
depending on the determined value indicative of the noise level associated with the first transmission line, selecting a transmission power of transmitting on the first transmission line.

4. The method of claim 3,
wherein said selecting of the transmission power of said transmitting on the first transmission line depends on a water-filling algorithm considering at least one of the following: as a reference of a water level of the water-filling algorithm, the value indicative of the noise level associated with the first transmission line; for each one of a plurality of carriers arranged in the first spectrum: at least one respective upper threshold of said communicating of the first data; and an integral upper threshold across the plurality of carriers.

5. The method of claim 1,
wherein the value indicative of the noise level associated with the first transmission line is determined spectrally resolved for a plurality of frequencies arranged in the first spectrum,
wherein the dynamic spectrum management is used spectrally resolved.

6. The method of claim 1,
wherein the value indicative of the noise level associated with the first transmission line is determined individually for the first transmission line.

7. The method of claim 1, further comprising:
during a training period, prior to said communicating of the first data and during said communicating of the second data: initializing the time-division duplexing scheme in a protection mode such that said communicating of the second data experiences a reduced crosstalk from the first transmission line, said reduced crosstalk being smaller than the second crosstalk.

8. The method of claim 1, further comprising:
during a training period prior to said communicating of the first data and during said communicating of the second data: setting a transmission power of transmitting on the first transmission line in the overlap spectrum to a predefined lower threshold.

9. The method of claim 8, further comprising:
at a beginning of Showtime during said communicating of the first data, gradually increasing the transmission power of said transmitting on the first transmission line in the overlap spectrum from the predefined lower threshold.

10. The method of claim 9, further comprising:
during a training period, prior to said communicating the first data and during said communicating of the second data: communicating synchronization symbols in the overlap spectrum via the first transmission line and according to the frequency-division duplexing scheme,
in response to said communicating of the synchronization symbols, retrieving a value indicative of the noise level of the second transmission line, said value indicative of the noise level of the second transmission line comprising at least the second crosstalk,
based on the retrieved value indicative of the noise level of the second transmission line, determining the predefined lower threshold.

11. The method of claim 1, further comprising:
during a training period, prior to said communicating the first data and during said communicating of the second data: communicating synchronization symbols in the overlap spectrum via the first transmission line and according to the frequency-division duplexing scheme.

12. The method of claim 1, further comprising:
during a training period, prior to said communicating of the first data and during said communicating of the second data: communicating training data in the overlap spectrum and via the first transmission line,
based on said communicating of the training data, determining a value indicative of the noise level associated with the first transmission line, said value indicative of the noise level associated with the first transmission line comprising at least the first crosstalk.

13. The method of claim 12,
wherein the training data is communicated on a plurality of carriers arranged in the first spectrum, wherein the training data is orthogonally coded with respect to the plurality of carriers.

14. The method of claim 1, further comprising:
during a training period and during said communicating of a given one of the first data and the second data and prior to communicating the other one of the first data and the second data: adding adaptive virtual noise to a respective one of the first transmission line or the second transmission line.

15. The method of claim 1,
wherein the first data is communicated employing a G.fast service,
wherein the second data is communicated employing a VDSL2 service.

16. The method of claim 1,
wherein the second spectrum is 2 MHz-35 MHz.

17. The method of claim 1,
wherein the overlap spectrum is 2 MHz-35 MHz.

18. A system, comprising:
a first transceiver configured to communicate, in a first spectrum and via a first transmission line, first data according to a time-division duplexing scheme,
a second transceiver configured to communicate, in a second spectrum and via a second transmission line, second data according to a frequency-division duplexing scheme,
wherein the first spectrum and the second spectrum both comprise an overlap spectrum,
wherein the first transmission line experiences first crosstalk from the second transmission line,
wherein the second transmission line experiences second crosstalk from the first transmission line,
wherein a value indicative of a noise level associated with the first transmission line is determined, said value indicative of the noise level associated with the first transmission line comprising at least the first crosstalk,
wherein, for said communicating of the first data, dynamic spectrum management of the first spectrum is used depending on the value indicative of the noise level associated with the first transmission line,
wherein the first data is communicated employing a plurality of carriers arranged in the first spectrum,
wherein said value indicative of the noise level associated with the first transmission line is determined depending on a length of the first transmission line,
wherein, for each one of the plurality of carriers, a respective upper threshold of a transmission power of transmitting on the first transmission line is determined depending on the value indicative of the noise level associated with the first transmission line.

* * * * *